United States Patent
Aryal

(10) Patent No.: US 10,453,476 B1
(45) Date of Patent: Oct. 22, 2019

(54) SPLIT-MODEL ARCHITECTURE FOR DNN-BASED SMALL CORPUS VOICE CONVERSION

(71) Applicant: Sandesh Aryal, Pasadena, CA (US)

(72) Inventor: Sandesh Aryal, Pasadena, CA (US)

(73) Assignee: OBEN, INC., Pasadena, CA (US)

(*) Notice: Subject to any disclaimer, the term of this patent is extended or adjusted under 35 U.S.C. 154(b) by 0 days.

(21) Appl. No.: 15/657,003

(22) Filed: Jul. 21, 2017

Related U.S. Application Data

(60) Provisional application No. 62/365,022, filed on Jul. 21, 2016.

(51) Int. Cl.
| | |
|---|---|
| *G10L 13/033* | (2013.01) |
| *G10L 25/24* | (2013.01) |
| *G10L 25/30* | (2013.01) |
| *G06N 3/04* | (2006.01) |
| *G10L 21/013* | (2013.01) |

(52) U.S. Cl.
CPC .............. *G10L 25/30* (2013.01); *G06N 3/04* (2013.01); *G10L 21/013* (2013.01); *G10L 25/24* (2013.01); *G10L 2021/0135* (2013.01)

(58) Field of Classification Search
CPC ....... G10L 13/00; G10L 13/02; G10L 13/033; G10L 25/24; G10L 25/30; G06N 3/02; G06N 3/04; G06N 3/0454
USPC ........ 704/258, 260, 269; 706/15, 26, 27, 32, 706/42
See application file for complete search history.

(56) References Cited

U.S. PATENT DOCUMENTS

| | | | | |
|---|---|---|---|---|
| 5,095,443 | A * | 3/1992 | Watanabe | G06N 3/0454 706/10 |
| 5,768,476 | A * | 6/1998 | Sugaya | G06N 3/0454 706/26 |
| 9,570,069 | B2 * | 2/2017 | Lehman | G10L 15/16 |
| 10,186,251 | B1 * | 1/2019 | Mohammadi | G10L 13/047 |
| 10,186,252 | B1 * | 1/2019 | Mohammadi | G10L 13/10 |
| 10,249,314 | B1 * | 4/2019 | Aryal | G06N 3/08 |
| 2003/0135356 | A1 * | 7/2003 | Ying | G06F 17/271 704/1 |
| 2009/0094027 | A1 * | 4/2009 | Nurminen | G10L 13/033 704/235 |
| 2012/0253794 | A1 * | 10/2012 | Chun | G10L 21/007 704/201 |
| 2014/0358546 | A1 * | 12/2014 | Fernandez | G10L 13/04 704/259 |

(Continued)

*Primary Examiner* — Martin Lerner
(74) *Attorney, Agent, or Firm* — Andrew S. Naglestad

(57) ABSTRACT

A voice conversion system suitable for encoding small and large corpuses is disclosed. The voice conversion system comprises hardware including a neural network for generating estimated target speech data based on source speech data. The neural network includes an input layer, an output layer, and a novel split-model hidden layer. The input layer comprises a first portion and a second portion. The output layer comprises a third portion and a fourth portion. The hidden layer comprises a first subnet and a second subnet, wherein the first subnet is directly connected to the first portion of the input layer and the third portion of the output layer, and wherein the second subnet is directly connected to the second portion of the input layer and the fourth portion of the output layer. The first subnet and second subnet operate in parallel, and link to different but overlapping nodes of the input layer.

5 Claims, 2 Drawing Sheets

(56) References Cited

U.S. PATENT DOCUMENTS

| | | | | |
|---|---|---|---|---|
| 2015/0073804 A1* | 3/2015 | Senior | ............... | G10L 13/06 |
| | | | | 704/259 |
| 2015/0364128 A1* | 12/2015 | Zhao | ............... | G10L 13/08 |
| | | | | 704/259 |
| 2016/0343366 A1* | 11/2016 | Fructuoso | ............... | G10L 13/08 |
| 2016/0379112 A1* | 12/2016 | He | ............... | G06N 3/08 |
| | | | | 706/25 |
| 2018/0012613 A1* | 1/2018 | Sun | ............... | G10L 15/08 |

* cited by examiner

SPLIT-MODEL ARCHITECTURE FOR DNN-BASED SMALL CORPUS VOICE CONVERSION

CROSS-REFERENCE TO RELATED APPLICATION(S)

This application claims the benefit of U.S. Provisional Patent Application Ser. No. 62/365,022 filed Jul. 21, 2016, titled "Split-model architecture for DNN-based small corpus voice conversion," which is hereby incorporated by reference herein for all purposes.

TECHNICAL FIELD

The invention generally relates to the field of voice conversion. In particular, the invention relates to a voice conversion system employing a neural network with a hidden layer comprising a plurality of subnets that encode different aspects of a speech corpus.

BACKGROUND

Voice conversion seeks to convert speech from a source speaker to sound like it is produced by a target speaker. A main aspect of voice conversion is the mapping of spectral characteristics of speech sound from source speaker to the same for target speaker. Among others, Mel cepstral (MCEP) coefficients are commonly used to capture the spectral characteristics of speech sound. MCEP is a representation of the short-term power spectrum in terms of a linear cosine transform of the log power spectrum in nonlinear Mel scale frequency. In a voice conversion method based on deep neural network (DNN), the MCEP coefficients (cc) for each segment of speech from the source speaker are replaced by the equivalent MCEP coefficients for the target speaker as estimated by a trained DNN model. The model is trained on recordings of the same sentences from the source and target speaker, using the MCEP coefficients from the source speaker ($cc^{src}$) as the input and the same from the target speaker ($cc^{tgt}$) as the output.

The relationships between the source and target MCEP coefficients $\{f: cc^{src} \rightarrow cc^{tgt}\}$ are dependent on the linguistic contents of the sounds (e.g., phonemes) and are highly nonlinear in nature. In order to map the source-target relationships in all possible linguistic contexts, a large network is required. When trained on small corpus, however, such a big network is likely to suffer from overfitting problems. Overfitting can be reduced by making the network smaller but it reduces its ability to learn the complex nonlinear relationship between the source and target features in different linguistic contexts. There is therefore a need for a technique for robustly learning a wide variety of linguistic content in both large and small corpuses.

SUMMARY

The invention in the preferred embodiment features a robust voice conversion system suitable for encoding small and large corpuses. The voice conversion system comprises a microphone for recording source speech data, a neural network for generating estimated target speech data based on the source speech data, a waveform generator configured to generate a target voice signal based on the estimated target speech data, and a speaker configured to play the target voice signal.

The neural network comprises and input layer, an output layer, and a split-model hidden layer. The input layer comprises a first portion and a second portion, wherein the first portion is associated with a first plurality of audio features, and the second portion is associated with a second plurality of audio features. The output layer comprises a third portion and a fourth portion, wherein the third portion is associated with a third plurality of audio features, and the fourth portion is associated with a fourth plurality of audio features. The hidden layer comprises a first subnet and a second subnet, wherein the first subnet is directly connected to the first portion of the input layer and the third portion of the output layer; and wherein the second subnet is directly connected to the second portion of the input layer and the fourth portion of the output layer.

The first subnet and second subnet operate in parallel and independently from one another. There are no links between them and they have different inputs. Although the inputs differ, the inputs generally overlap. In one embodiment, the acoustic features associated with the first portion are also provided as input to the second portion along with additional features, thus resulting in an overlap of features.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 1:
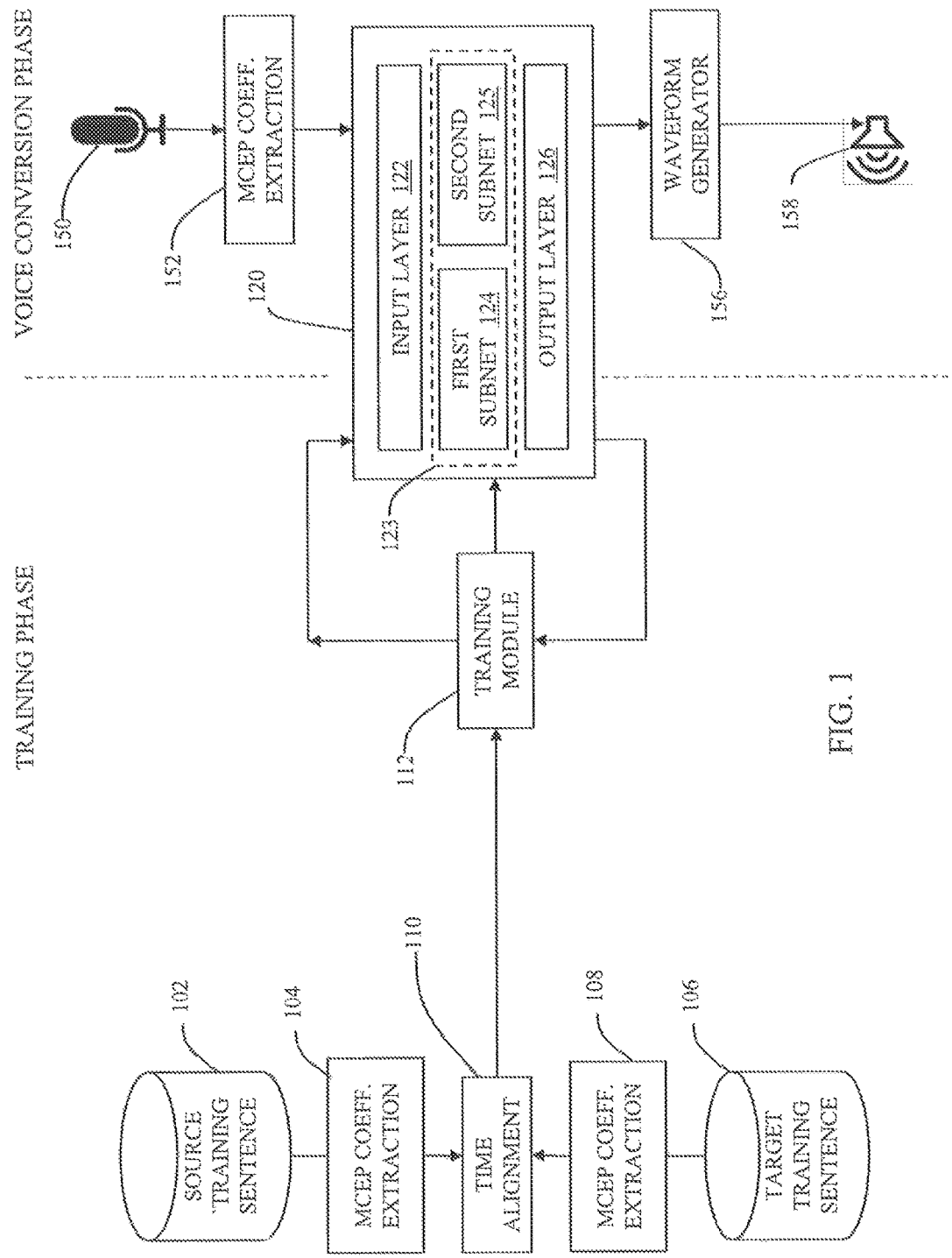
FIG. 1 is a functional block diagram of a system including a split-model deep neural network (DNN) for performing voice conversion, in accordance with the preferred embodiment of the present invention.

Illustrated in FIG. 1 is a functional block diagram of a system for training and implementing a split-model deep neural network (DNN). The functional block diagram is organized with the training components to the left and voice conversion components to the right. The training phase generally focuses on creation of the split-model DNN while the voice conversion phase focuses on application of the DNN.

Training is based on sets of training sentences including source training speech recorded from a source speaker and target training speech recorded from a target speaker. Training sentences in general include audio data of a speaker reciting a plurality of sentences that are selected to capture a wide variety of phonemes and diphones in order to accurately produce new but different speech. The training sentences in the preferred embodiment comprise overlapping segments—also known as frames—typically 25 ms segments at 5 ms intervals. The training sentences may be received in the form of an audio signal from a microphone or a recording retrieved from one or more memory devices such as databases 102, 106.

The audio features are then extracted from the training sentences by extraction modules 104, 106. In the preferred embodiment, the audio features are Mel cepstral (MCEP) coefficients. MCEP coefficients represent the short-term power spectrum as the linear cosine transform of the log power spectrum on a nonlinear Mel scale of frequency. In the Mel cepstral representation, an utterance can be represented as a time sequence of D-dimensional vectors $y(=[y_1, y_2 \ldots y_T])$ where $y_t(=[y_t(1), y_t(2), \ldots y_t(d), \ldots y_t(D)])$ is a vector of D MCEP coefficients representing the spectral characteristics of a speech segment at time frame t, and T is the number of frames in the utterance. Although MCEP coefficients are the features used to characterize the voice data in the preferred embodiment, other features including linear prediction coefficients (LPC), line spectral frequencies (LSF) features, and short term Fourier Transform (STFT) may also be used instead of MCEP coefficients.

The MCEP coefficients of the target training speech are then temporally aligned with the MCEP coefficients of the source training speech by an alignment module 110. Frames are matched based on similarity of the MCEP coefficients extracted from these source and target frames. The output of the alignment module includes target speech frames with corrected timing information as well as the MCEP coefficients, $y_t$, of those frames. The result of this process is a table consisting of pairs of source and target frames with matching MCEP coefficients.

The MCEP coefficients, $y_S$, from the source speaker sentences and the time-aligned version of the target speaker sentences are then transmitted to the training module 112 to encode the various nodes and link weights of the deep neural network (DNN) 120. Specifically, the DNN is trained to take the source MCEP coefficients as input and output an estimate of the target MCEP coefficients with which to reconstruct sentences in the voice of the target speaker but comprising the same speech as that spoken by the source speaker. The split-model DNN of the present invention can be trained following any of the algorithms already employed to train conventional DNN architectures including backpropagation, for example.

In the preferred embodiment, the DNN consists of an input layer 122, a plurality of hidden layers including a first hidden subnet 124 and a second hidden subnet 125, and an output layer 126. The hidden subsets may comprise a layer with a plurality of nodes, or a plurality of layers of nodes. Links then selectively connect the nodes of adjacent layers. These links are characterized by weights that are finely tuned and adjusted during the training process. The input and output layers, which generally comprise the same number of MCEP coefficients, typically comprise 50 nodes.

After training of the DNN 120 is complete, the system in FIG. 1 can effectively perform voice conversion. In this mode, the speech of a source speaker is collected by a microphone 150. The MCEP coefficients are then extracted by the feature extraction module 152. The extracted MCEP coefficients are provided as input to the DNN 120 which outputs an estimate of the target speech data in the novel manner described below. The estimate of the target speech data comprises a plurality of MCEP coefficients that are converted into an audio signal by the waveform generation 156. This audio signal, which includes realistic-sounding target speech, may be played to the source speaker via the speaker 158.

1. Split-Model Architecture

Figure 2:
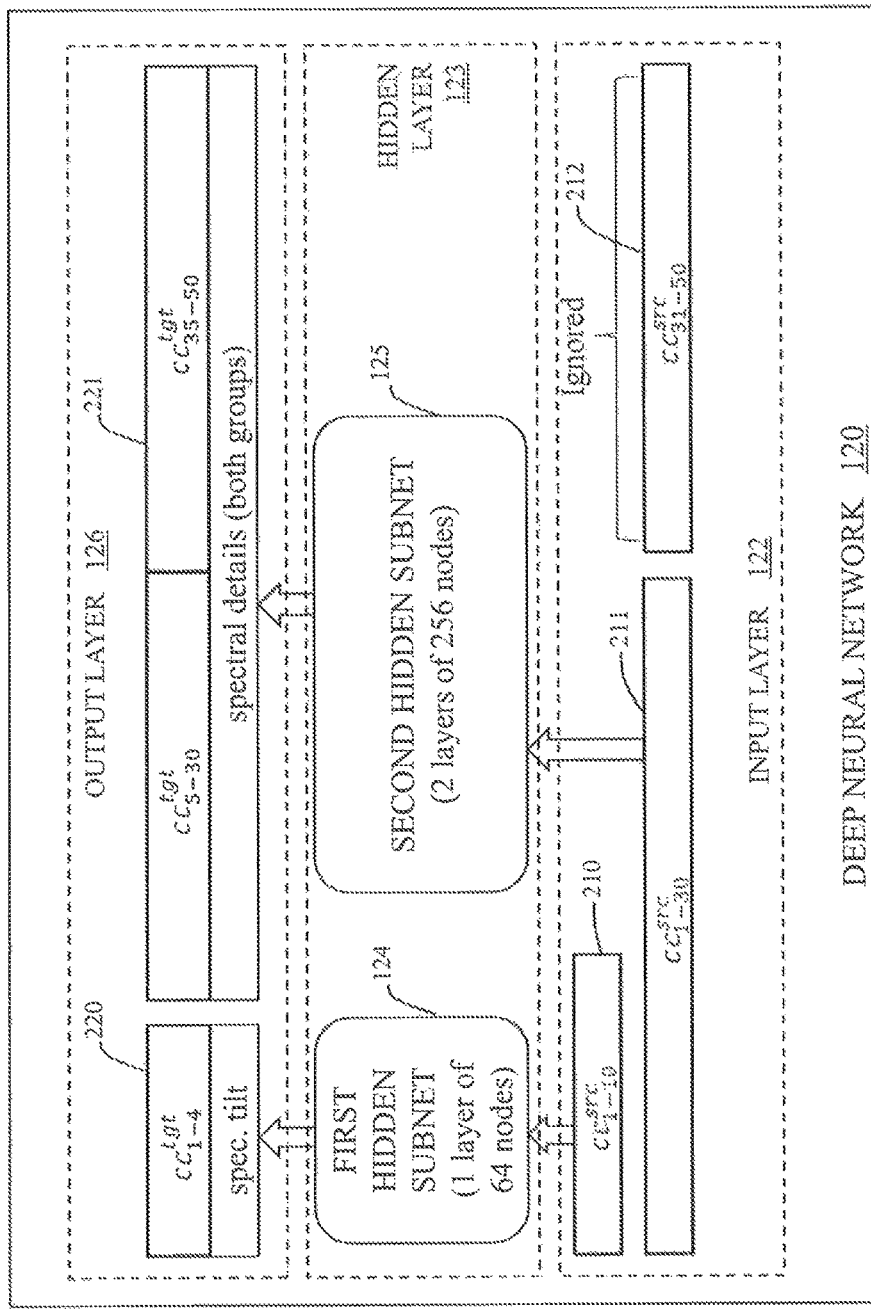
FIG. 2 is a functional a split-model deep neural network (DNN) for performing voice conversion, in accordance with the preferred embodiment of the present invention.

Illustrated in FIG. 2 is a diagrammatic representation of the split-model DNN 120 in the preferred embodiment. The input layer 122 generally has nodes for the input of MCEP coefficients 1-50. In the preferred embodiment, the input layer 122 comprises a first portion 210 configured to receive MCEP coefficients 1-10 as well as a second portion 211 configured to receive coefficients 1-30. The first portion 210 of the input layer 122 represents the "spectral tilt" of the source speech while the second portion 211 of the input layer 122 captures "learnable spectral details" of the source speech. MCEP coefficients 31-50 tend to vary with respect to a single user and, if available, are preferably discarded. The hidden layer 123 includes a first hidden subnet 124 and a second hidden subnet 125. The two sets of nodes 124-125 of the hidden-layer 123 operate independently from one another and in parallel on different sets of MCEP coefficients.

The first hidden subnet 124 is fully linked directly to the source speech MCEP coefficients 1-10, i.e., the first portion 210 of the input layer 122. The MCEP coefficients 1-10 correspond to the lower frequencies and mainly represent the effect of vocal tract shape and size. These frequencies are speaker-specific. The process of mapping the lower coefficients 210 of the input layer is less complex and requires significantly fewer hidden nodes than the one used in the DNN architectures in the prior art. In the preferred embodiment, the first hidden subnet 124 comprises a single layer comprising 64 nodes.

The second hidden subnet 125 is fully linked directly to the source speech MCEP coefficients 1-30, i.e., the second portion 211 of the input layer 122. The second hidden subnet 125 links to the same lower coefficients as the first hidden subnet 124 as well as the higher coefficients of the second portion 211. The overlap in input MCEP coefficients helps to blur the hard grouping of 'spectral tilt' and 'detail' in MCEP coefficients. In addition, the higher coefficients mainly capture the finer spectral details of the linguistic content. In the preferred embodiment, the second hidden subnet 125 comprises two layers of nodes, each layer comprising 256 nodes.

The output layer 126 comprises a third portion 220 fully coupled to the first hidden subnet 124 alone. The output layer 126 further comprises a fourth portion 221 fully coupled to the second hidden subnet 125 alone.

By separating the hidden layer 123 into two parallel hidden subnets 124-125, the voice conversion system enables the DNN 120 to learn the coarse and finer characteristics of the MCEP coefficients independently. The complexity of the source-target mapping of the finer linguistic details is also reduced due to the separation. Hence, fewer nodes are required to capture these relations than in the conventional DNN architectures.

The last few MCEP coefficients 31-50 of the third portion 212 of the input layer 122 capture the variability of speech within an individual speaker. This variability may not be learned effectively using a parallel corpus. Hence, these coefficients from the input 122 may be ignored in some embodiments without any impact on the performance of voice conversion.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A voice conversion system comprising:
a microphone for recording source speech data;
a neural network for generating estimated target speech data based on the source speech data, wherein the neural network comprises:
  a) an input layer comprising a first portion and a second portion, wherein the first portion is associated with a first plurality of audio features, and the second portion is associated with a second plurality of audio features; wherein second plurality of audio features overlaps with the first plurality of audio features and comprises each of the first plurality of audio features; wherein the first plurality of audio features comprises MCEP coefficients one through 10; and the second plurality of audio features comprises MCEP coefficients one through 30;
  b) an output layer comprising a third portion and a fourth portion, wherein the third portion is associated with a third plurality of audio features, and the fourth portion is associated with a fourth plurality of audio features; and
  c) a hidden layer comprising a first subnet and a second subnet; wherein the first subnet is directly connected to the first portion of the input layer and the third portion of the output layer; and wherein the second subnet is directly connected to the second portion of the input layer and the fourth portion of the output layer;
a waveform generator configured to generate a target voice signal based on the estimated target speech data; and
a speaker configured to play the target voice signal.

2. The voice conversion system of claim 1, wherein the first subnet comprises a single layer of nodes, and wherein the second subnet comprises two layers of nodes.

3. The voice conversion system of claim 2, wherein the first subnet comprises a single layer of nodes comprising 64 nodes, and wherein the second subnet comprises two layers of 256 nodes each.

4. A voice conversion system comprising:
a microphone for recording source speech data;
a neural network for generating estimated target speech data based on the source speech data, wherein the neural network comprises:
  a) an input layer comprising a first portion and a second portion, wherein the first portion is associated with a first plurality of audio features, and the second portion is associated with a second plurality of audio features; wherein second plurality of audio features overlaps with the first plurality of audio features and comprises each of the first plurality of audio features;
  b) an output layer comprising a third portion and a fourth portion, wherein the third portion is associated with a third plurality of audio features, and the fourth portion is associated with a fourth plurality of audio features; and
  c) a hidden layer comprising a first subnet and a second subnet; wherein the first subnet is directly connected to the first portion of the input layer and the third portion of the output layer; and wherein the second subnet is directly connected to the second portion of the input layer and the fourth portion of the output layer; wherein the first subnet comprises a single layer of nodes comprising 64 nodes, and wherein the second subnet comprises two layers of 256 nodes each;
a waveform generator configured to generate a target voice signal based on the estimated target speech data; and
a speaker configured to play the target voice signal.

5. The voice conversion system of claim 4, wherein the first plurality of audio features comprises MCEP coefficients one through 10; and the second plurality of audio features comprises MCEP coefficients one through 30.

* * * * *